United States Patent [19]

Beaudoin

[11] Patent Number: 4,502,353

[45] Date of Patent: Mar. 5, 1985

[54] CARRIER BRAKED FORWARD AND REVERSE PLANETARY TRANSMISSION

[76] Inventor: Gaston Beaudoin, 241 St. Damase, Drummondville, Quebec, Canada, J2B 6J2

[21] Appl. No.: 461,198

[22] Filed: Jan. 26, 1983

[51] Int. Cl.³ .................. F16H 3/44; F16H 37/00; B60K 20/02
[52] U.S. Cl. ............................ 74/792; 74/789; 74/473 R; 74/689
[58] Field of Search ............ 74/689, 789, 792, 801, 74/473 R, 475, 533, 740; 474/19; 192/67 R

[56] References Cited

U.S. PATENT DOCUMENTS

| | | | |
|---|---|---|---|
| 418,516 | 12/1889 | Huber | 74/792 |
| 475,901 | 5/1892 | Shepard | 74/789 |
| 724,263 | 3/1903 | Cook | 74/792 |
| 955,717 | 4/1910 | Struck | 74/792 X |
| 1,161,463 | 11/1915 | Hineline | 74/792 |
| 1,248,370 | 11/1917 | Million | 74/792 |
| 1,794,044 | 2/1931 | Tuttle | 74/792 |
| 3,005,360 | 10/1961 | Carlson | 74/792 |
| 3,478,622 | 11/1969 | Reid | 74/792 |
| 3,529,494 | 9/1970 | Matte | 74/792 |
| 3,563,114 | 2/1971 | Casale | 74/792 |
| 3,572,170 | 3/1971 | Tashiro | 74/792 |
| 3,908,483 | 9/1975 | Piquette | 74/792 |
| 4,446,951 | 5/1984 | Morris | 74/473 SW X |

FOREIGN PATENT DOCUMENTS 442311 2/1936 United Kingdom .................. 74/533

Primary Examiner—Allan D. Herrmann
Assistant Examiner—Arthur T. Quiray
Attorney, Agent, or Firm—Robic, Robic & Associates

[57] ABSTRACT

Gear transmission system particularly for a motor vehicle. It comprises a shaft assembly made up of an outer driving shaft and an inner driven shaft, both coaxial, with the driven shaft extending out of the driving shaft at both ends. The driven shaft is formed with an internal gear circumscribing the shaft, a sun gear integral with the driving shaft being located within the internal gear and a planetary gear support radially extends from the driving shaft, being mounted thereon for free rotation and slidable axial displacement therealong. The support has rotary planetary gears meshing respectively with the sun gear and with the internal gear. A transmission member, integral with the driving shaft, is disposed in radial facing relation with the gear support and provided, along with the gear support, with cooperating gear teeth suitable to mesh together for forward driving of the vehicle. A shift mechanism, operable by control member, causes engagement and disengagement of the planetary gear support and transmission member to cause alternate forward and reverse drives as well as idling of the driving shaft.

8 Claims, 7 Drawing Figures

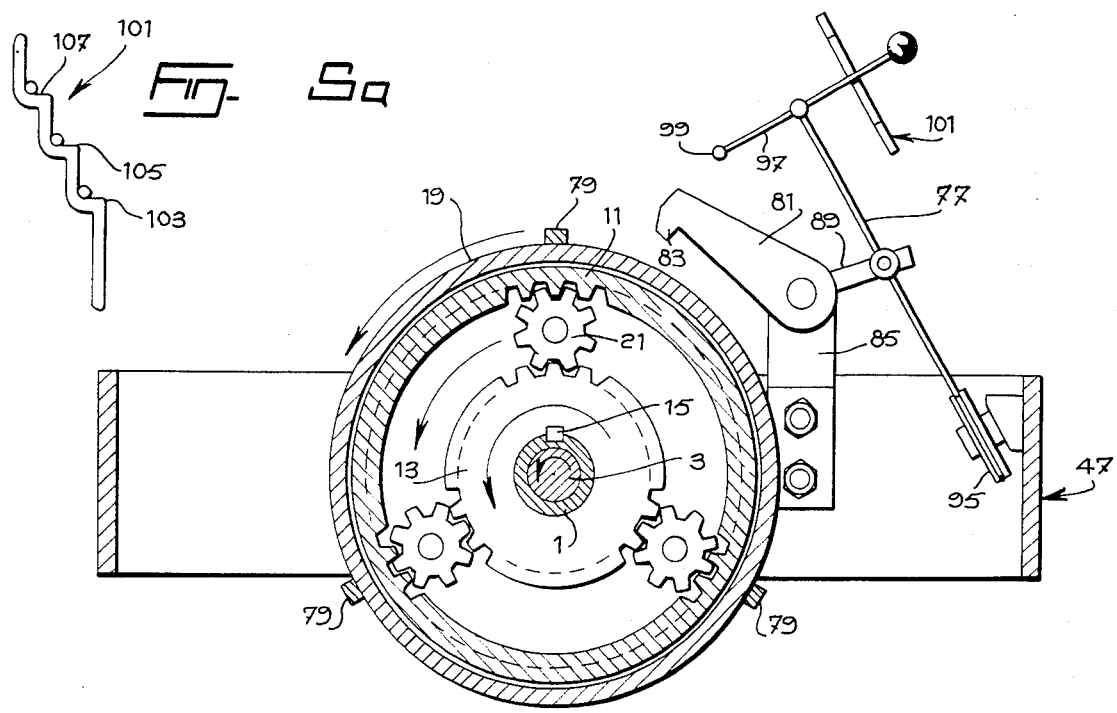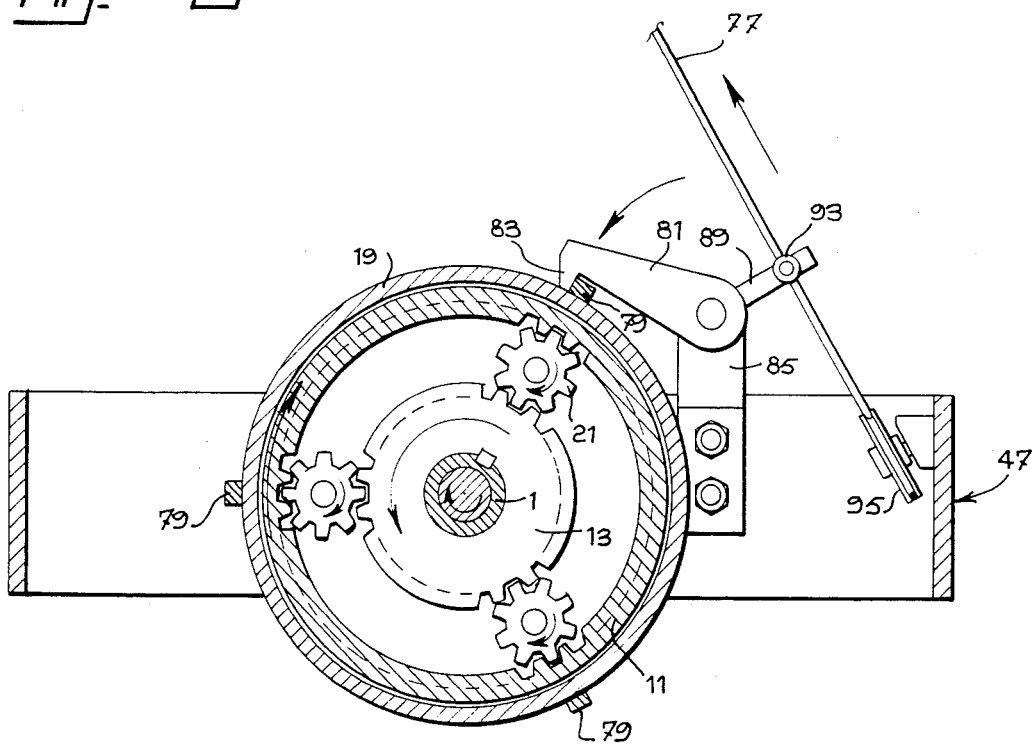

CARRIER BRAKED FORWARD AND REVERSE PLANETARY TRANSMISSION

The present invention relates to a gear transmission system, for particular use on a motor vehicle, and suitable to transmit power from the vehicle engine to the traction wheels of the vehicle or to flexible bands in the case of a snowmobile or of a caterpillar tractor.

A main object of the present invention lies in the provision of a transmission system of the above type that is quite compact so as to be suitable for vehicles and extremely simple in construction whereby it may be manufactured at low cost while being easily serviced.

Another object of the present invention is to provide such a transmission system suitable to allow forward and reverse movement of the vehicle as well as to provide for idling of the vehicle by the simple pivotal displacement of a lever in a two-step movement.

A prior art search was made before the preparation and filing of the instant application, which search has revealed the following U.S. patents, a careful study of which shows that none is truly pertinent as none discloses a transmission system having the aforesaid advantageous objects, particularly the simplicity in construction and maintenance, resulting in low manufacturing and upkeep cost: U.S. Pat. Nos. 955,717, of Apr. 19, 1910; 1,161,463 of Nov. 23, 1915; 1,794,044 of Feb. 24, 1931; 3,529,494 of Sept. 22, 1970; 3,563,114 of Feb. 16, 1971; 3,572,170 of Mar. 23, 1971.

In order to achieve the above objects, according to the broad concept of the invention, there is provided and claimed herein a gear transmission system, particularly for a motor vehicle having a frame, the system comprising: a shaft assembly made up of a hollow cylindrical outer driving shaft and a cylindrical inner driven shaft mounted coaxially with and in the driving shaft to be driven thereby; the driven shaft extending out of the driving shaft at both ends thereof; means integral with one end of the driven shaft defining an internal gear circumscribing the shafts; a sun gear integral with the driving shaft and located within the internal gear; a planetary gear support radially extending from the driving shaft and mounted thereon for free rotation and slidable axial displacement therealong; planetary gears rotatably mounted on the support to be slidable therewith, the planetary gears meshing respectively with the sun gear and the internal gear; a driving assembly on the driving shaft including a power transmission member integral with the driving shaft for rotation therewith, the transmission member being disposed in radial facing relation with the planetary gear support; cooperating gear teeth on the gear support and transmission member suitable to mesh together for forward driving the vehicle through unison rotation of the sun gear, planetary gears and internal gear about the axis of the shafts; a shift mechanism, and a control member mounted on the vehicle frame to be movable in two steps, the control member being connected to the shift mechanism to, in a first step, disengage the transmission member and planetary gear support causing the support idly to rotate through the sun gear and planetary gears with said driven shaft coming to a stop under the resisting torque thereof and, in a second step, to stop rotation of the planetary gear support relative to the driving shaft thereby causing reverse rotation of the internal gear and driven shaft through the sun gear and planetary gears.

According to a preferred embodiment, the shift mechanism comprises a ring means cooperating with a circumferential groove of the planetary gear support, this ring means having a first and a second radial arm, extending on opposite sides of the planetary gear support; means mounting the first arm on the vehicle body so that it can pivot the ring means about an axis which is normal to the axis of the shafts, and further means to displace the second radial arm to so pivot the first arm. In this manner, the aforesaid mechanism can shift the planetary gear support so that it engages and disengages the respective cooperating teeth. The shift mechanism of the preferred embodiment further comprises resilient means acting on the second arm to bias the cooperating teeth in meshing engagement, a flexible cable fixed at one end to the control member and secured at the other end to the second arm, the whole being so constructed that upon pulling of the cable in one direction against the bias of the resilient means, the cooperating teeth disengage in accordance with the aforesaid first step. Additional blocking means are provided which are connected to the cable and operable, by further pulling of the cable in the said one direction and in accordance with the second step, to stop rotation of the planetary gear support.

Other objects and advantages of the invention will become apparent from the following description of a preferred embodiment having reference to the appended drawing wherein:

FIG. 5 is a transverse cross-sectional view in the plane of line V—V of FIG. 2 while FIG. 5a shows a detail, and FIG. 6 is transverse cross-sectional view like that of FIG. 5 but showing the transmission in rearward drive.

Figure 1:
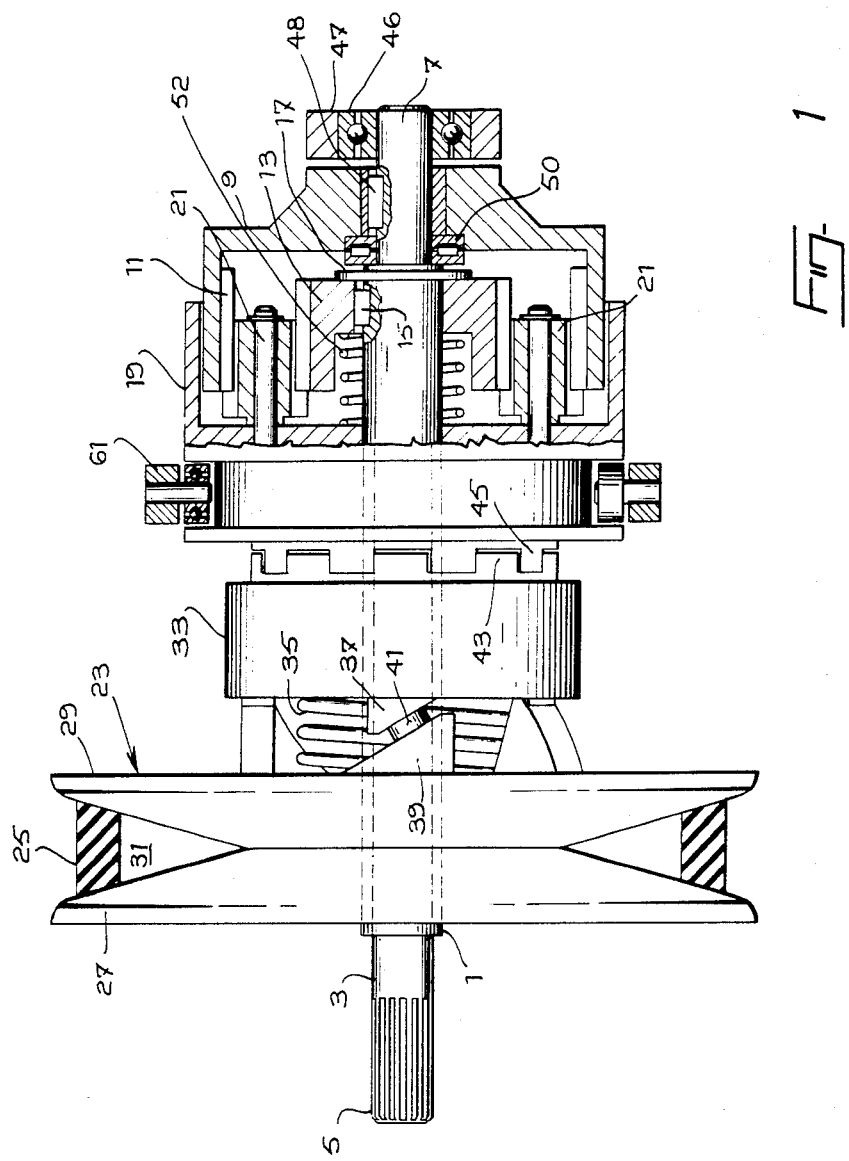
FIG. 1 is a side elevation view, partly in cross-section, showing a gear transmission system made according to the invention in forward drive position.

The gear transmission system, with particular reference to FIGS. 1 and 2, has a shaft assembly which is made up of a hollow cylindrical outer driving shaft 1 and of a cylindrical inner driven shaft 3 mounted coaxially with and in the driving shaft 1 to be driven by it in a manner more to be fully described hereinafter. As shown, the driven shaft 3 extends out of the driving shaft 1 at both ends thereof. One end 5 of the driven shaft 3 is longitudinally grooved for connection, in known manner, to a power assembly (not shown) suitable to drive the vehicle wheels or caterpillar track.

The other end 7 of the driven shaft 3 extends out radially into a flange 9 having formed, at its outer periphery, an internal gear 11 which is reversely directed so as to circumscribe the corresponding end portions of the shafts 1 and 3.

A sun gear 13 is splined on the driving shaft 1 by a key 15 so as to be brought into rotation with the driving shaft 1. It is further held against axial relative displacement with the driving shaft in a known manner such as by means of a lock ring 17. Thus, the sun gear 13 becomes integral with the driving shaft 1.

Freely mounted on and around the driving shaft 1 is a planetary gear support 19 that can freely rotate and axially slide with respect to the driving shaft 1. Planetary gears 21 are mounted on the support 19 so that they can rotate freely with respect to the support 19 about axes that are normal to one face of the said support 19, as clearly shown in FIGS. 1 and 2. The planetary gears mesh respectively with the sun gear 13 and with the internal gear 11.

Power is obtained from the vehicle engine by means of a driving assembly including a variable diameter V-belt hook up of known type. The latter includes a pulley, driven by a belt 25 of trapezoidal cross-section, and formed of a pair of side cheeks 27, 29 having substantially frusto-conical inner surfaces facing one another to define a groove 31 for the belt. The cheek 27 is fixedly mounted on the driving shaft 1 to rotate therewith and to be held against axial displacement. The other cheek 29, however, is freely mounted on the shaft 1 so that it can rotate and move in translation independently of the shaft 1.

Away from the outer face of the cheek 29 is a power transmission member 33 secured, in any known manner, on the driving shaft 1 so as to rotate therewith and being held against relative axial displacement. A coil spring 35, winding around the shaft 1, has one of its ends fixed to the cheek 29 while the other end is fixed to the power transmission member 33. In this manner, the spring 35 biases the cheek 29 toward the cheek 27, as is known.

Cooperating pairs of cams 39, 37, are fixed respectively on the cheek 29 and the power transmission member 33 to project toward facing surfaces. One or the other of the cam 37, 39 of each pair is provided with a bearing pad 41.

The aforedescribed driving assembly is well known and it will be appreciated that when the pulley is brought into rotation by the V-belt 25, the rotation thereof is transferred onto the power transmission member 33 through the coil spring 35, the cams 37, 39 and the bearings pads 41 taking care of any axial displacement of the movable pulley cheek 29.

Figure 2:
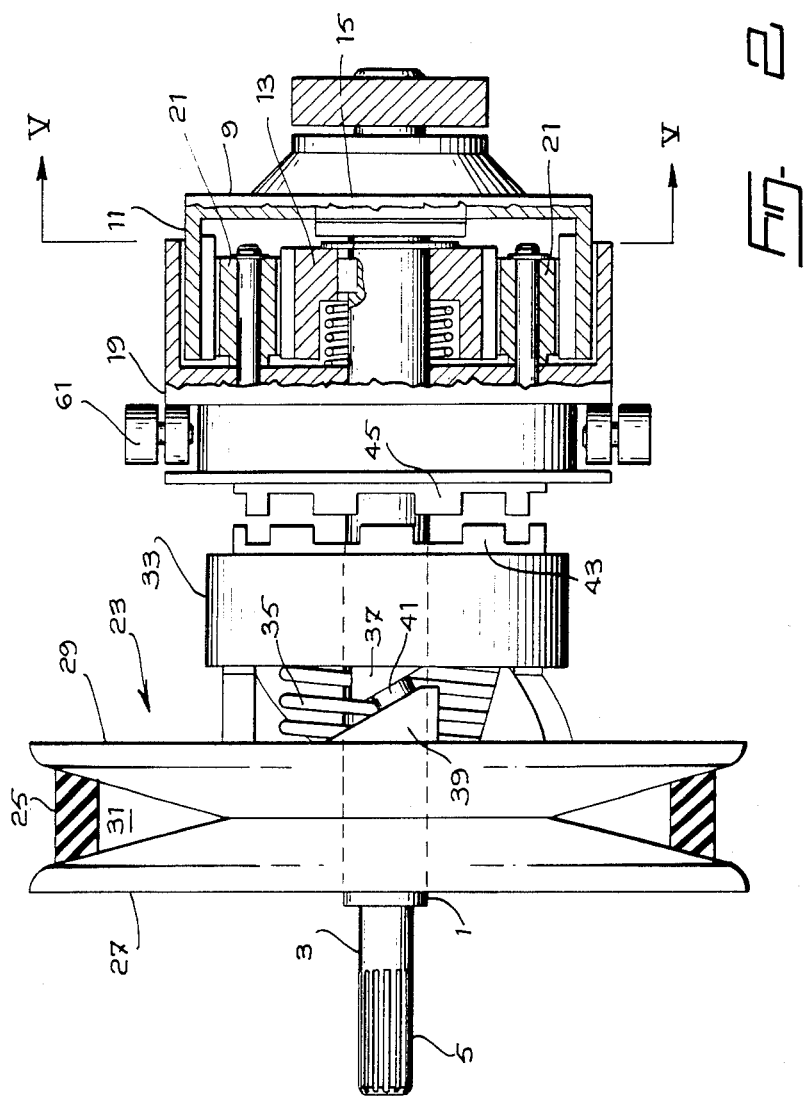
FIG. 2 is a view similar to FIG. 1 but showing the transmission system in either neutral position or in rearward drive.

Projecting from radial facing surfaces of the planetary gear support 19 and the power transmission member 33 are gear teeth 43, 45 capable of intermeshing with one another as shown in FIG. 1.

From the above description, it can now be gathered that, when the gear teeth 43, 45 intermesh as in FIG. 1, rotation of the power transmission member 33 through the driving assembly 23 causes rotation of the planetary gear support 19 and its planetary gears 21 about the axis of the driving shaft 1. Since all gears are in mesh, the internal gear 11 is brought into rotation and because it is integral with the driven shaft 3, the latter also rotates and this is the situation of forward driving of the vehicle. This situation of all gears 13, 21 and 11, rotating in unison about the common axis of the shafts 1 and 3, is also shown in FIG. 5.

Assuming now that the planetary gear support 19 is shifted rightward of the power transmission member 33 until the teeth 43, 45 disengage, the driving shaft 1 will keep on rotating in the same direction bringing with it the sun gear 13 but because the planetary gear support 19 is freely mounted on the driving shaft 1 and because also of the resisting torque of the driven shaft 3 transferred onto the internal gear 11, the latter will stop rotating so that the planetary gears 21 will be driven in reverse direction causing the planetary gear support 19 to rotate idly in the same direction as that of the driving shaft 1. This is also of course the idling condition of the vehicle motor.

Assuming now further that the planetary gear support 19 is stopped from rotating (see FIG. 6) by some mechanism to which reference will be made hereinafter, the rotary situation is as follows.

The driving shaft 1 and sun gear 13 keep on rotating in the same direction as above but because the planetary gear support 19 is stationary, the planetary gears 21 themselves are forced to rotate in a direction of rotation opposite that of the sun gear 13 and shaft 1 causing reverse rotation of the internal gear 11 and, consequently, rotation in reverse of the driven shaft 3.

The above gear transmission system thus provides for forward drive, idling and reverse drive.

With reference to FIG. 1 again, there is shown to the right thereof a manner of mounting the rightward end of the driven shaft 3 (and consequently the driving shaft 1 and the complete gear transmission system) onto the vehicle frame generally referred to here by reference numeral 47. There may of course be several ways of mounting the said driven shaft 3 and the one hereinafter described is only given as an example.

More specifically, the driven shaft 3 has its end 7 supported by the frame 47 through a standard ball bearing 46. As to the flange 9 which defines the internal gear 11, it is made solid with the end 7 of the shaft 3 by being splined to it through a key 48. Finally, a roller thrust bearing is applied between the flange 9 and the corresponding end of the driving shaft 1.

The shift mechanism responsible for providing the control displacement of the planetary gear support 19 to produce the aforedescribed functions is best illustrated in FIGS. 3 through 6 and will now be described in detail.

A ring means includes a ring 61 and is loosely mounted in a circumferential groove 63 of the planetary gear support 19. The ring means further has a first ring arm 65 and a second ring arm 67 both of which extend radially of the ring 61 and on opposite sides thereof. The first arm 65 is mounted on the body 47 of the vehicle through a bracket 69 for pivotal movement of the ring 61 about an axis which is normal to the axis of the shafts 1, 3.

The ring 61 itself has a pair of diametrically opposite bearings in the form of rollers 71 which also are capable of rotating about a common axis normal to and intersecting that of the shafts 1, 3.

Figure 3:
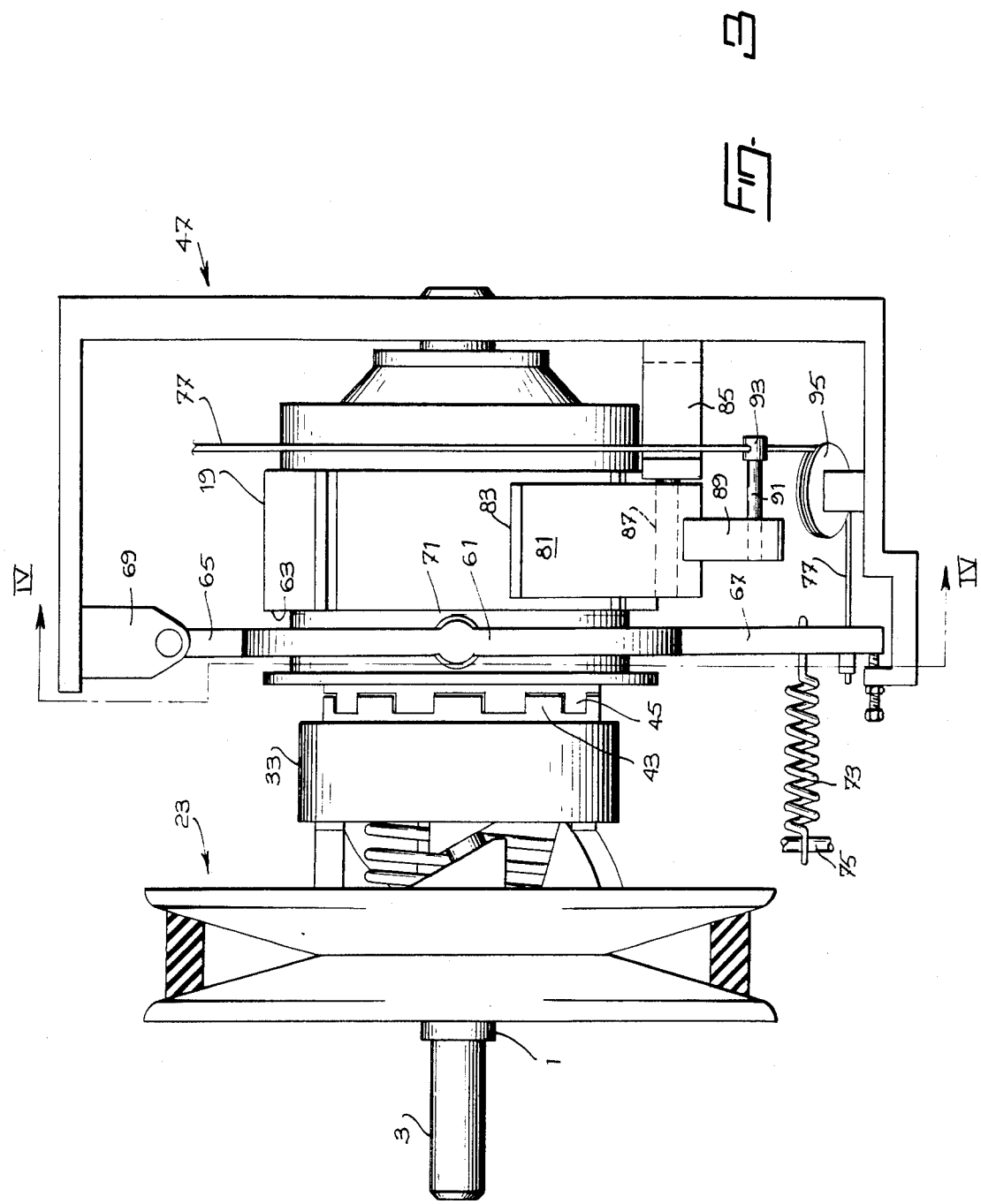
FIG. 3 is a top plan view of the gear transmission system shown in FIGS. 1 and 2.
Figure 4:
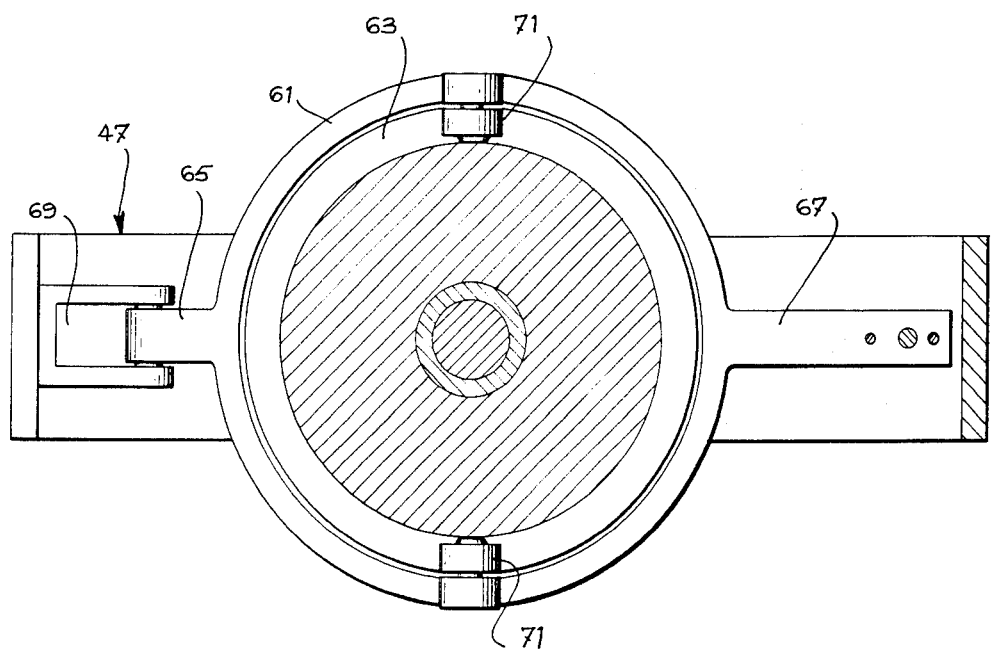
FIG. 4 is a transverse cross-sectional view in a plane running along line IV—IV of FIG. 3.

From the above description and with particular reference to FIG. 3, it will readily be understood that swinging of the second arm 67 about the pivot axis of the ring means causes shifting of the planetary gear support 19 for engagement and disengagement of the cooperating teeth 43, 45, as aforesaid, to produce the desired forward, neutral and reverse drive.

In order to ensure biasing of the planetary gear support 19 towards the power transmission member 33 for meshing of the teeth 43, 45, normally to ensure forward drive of the vehicle, a coil spring 73 is provided which has one end connected to the second ring arm 67 while the other end is secured to a stationary part of the vehicle body represented, in FIG. 3, by a rod 75.

Swinging of the ring 61 against the bias of the spring 73 is obtained by flexible cable 77 of which one end is secured, in any known manner, to the second arm 67 and at the outer end thereof adjacent the connection of the spring 73 thereto.

As inferred above, the shifting mechanism also includes blocking means connected to the cable 77 and operable to stop rotation of the planetary gear support 19 to achieve reverse drive of the driven shaft 3.

The shown blocking means comprises a series of lugs 79, three being shown in FIGS. 5 and 6, projecting radially outwardly of and in spaced relation along the periphery of the planetary gear support 19; a pawl 81 having an engagement tooth 83 at one end and pivotally mounted, at the other end, to the vehicle frame 47 through a bracket 85 secured thereto thus allows movement of the pawl 81 relative to the planetary gear support 19, as shown in FIGS. 5 and 6. In the latter FIG. 6, the tooth 83 is in engagement with one of the lugs 79 thereby causing stopping of the rotation of the planetary gear support 19.

Pivotal action of the pawl 81 is obtained by means of an axle 87 (FIG. 3) fixed to and projecting from an upward flange of the bracket 85.

Pivotal motion of the pawl 81 in the manner above described is achieved by means of an actuating lever 89 which is part of the pawl 81 and which is located behind the pivotal axle 87 with respect to the engagement tooth 83. Extending laterally of and solid with the actuating lever 89 is a rod 91 of which the free end is secured to the operating cable 77, at 93, in any known manner. Finally, the cable 77, between the second arm 67 of the ring 61 and the lever 89 previously referred to, winds around a pulley 95 mounted for free rotation on the vehicle body 47.

Referring to the upper part of FIG. 5 and to FIG. 5a, it will be seen that the aforesaid control member is an elongated lever 97 mounted, at one end 99, to the vehicle body for pivotal movement about an axis parallel to the axis of the shafts 1, 3. The flexible cable 77 has its other end fixed to the lever 97 intermediate the ends of the latter. On the side of the cable 77 opposite the lever pivot 99 is a lever rest 101 defining three successive lands 103, 105 and 107, being secured also to the vehicle body.

It will thus be appreciated that it is thereby possible to move the control member or lever 97 in a two-step movement: a first step where it moves from land 103 to land 105 and a second step where it moves from land 105 to land 107.

The length of the cable 77 is selected so that when the control rod 97 rests in the land 103, the planetary gear support 19 and the power transmission member 33 are completely in full meshing engagement of their corresponding teeth 43, 45. When moving from land 103 to land 105, the support 19 and the member 33 are in complete disengagement, as shown in FIG. 2 but the pawl 81 has not pivoted sufficiently to engage any of the lugs 79 so that the gear support 19 idles in the same direction. Movement of the control rod 97 in accordance with the second step, that is between land 105 to land 107 causes additional rotation of the pawl 81 so that its engagement tooth 83 engages with an incoming lug 79 to stop the rotation of the planetary gear support 19 and, consequently, reverse rotation of the driven shaft 3, as explained above.

The above description is that of a preferred embodiment of the invention and it will be understood that various modifications may be made by those skilled in the art while remaining within the scope of the invention, as defined in the appended claims.

Thus, the particular ring construction 61 could be replaced by a fork. Also, while the use of a circumferential groove 63 is preferred, it could also be omitted in which case a return spring 52 (FIG. 1) would be used to bias the planetary gear support 19 leftward for meshing engagement with the power transmission member 33, rightward motion of support 19 being of course still provided by the ring construction 61 acting on a suitable abutment surface of the support member 19.

What is claimed is:

1. A gear transmission system particularly for a motor vehicle having a frame, said system comprising:

a shaft assembly made up of a hollow cylindrical outer driving shaft and a cylindrical inner driven shaft mounted coaxially with an in said driving shaft to be driven thereby; said driven shaft extending out of said driving shaft at both ends thereof;

means integral with one end of said driven shaft defining an internal gear circumscribing said shafts;

a sun gear intergral with said driving shaft and located within said internal gear;

a planetary gear support radially extending from said driving shaft and mounted thereof for free rotation and slidable axial displacement therealong; planetary gears rotatably mounted on said support to be slidable therewith, said planetary gears meshing respectively with said sun gear and said internal gear;

a driving assembly on said driving shaft including a power transmission member integral with said driving shaft for rotation therewith, said member being disposed in radial facing relation with said planetary gear support;

cooperating gear teeth on said gear support and transmission member suitable to mesh together for forward driving gear vehicle through unison rotation of said sun gear, planetary gears and internal gear about the axis of said shafts;

a shift mechanism and a control member mounted on said vehicle frame to be movable in two steps, said control member being connected to said shift mechanism to, in a first step, disengage said transmission member and said planetary gear support causing said support idly to rotate through said sun gear and planetary gears with driven shaft coming to a stop under the resisting torque thereof and, in a second step, to stop rotation of said planetary gear support relative to said driving shaft thereby causing reverse rotation of said internal gear and driven shaft through said sun gear and planetary gears, wherein said shift mechanism comprises:

ring means cooperating with a circumferential groove of said planetary gear support and having a first and a second radial arm respectively on opposite sides of said planetary gear support;

means mounting said first arm on said vehicle body for pivotal action of said ring means about an axis normal to the axis of said driving and driven shafts and means to displace said second radial arm to pivot said first arm, causing shifting of said planetary gear support for engagement and disengagement of the respective cooperating teeth;

resilient means acting on said second arm to bias said cooperating teeth in meshing engagement a flexible cable fixed at one end to said control member and secured at the other end to said second arm, so constructed that pulling of said cable in one direction is against the bias of said resilient means and disengages said cooperating teeth in accordance with said first step; and blocking means connected to said cable and operable, by further pulling of said cable in the said one direction and in accordance with said second step, to stop rotation of said planetary gear support.

2. A gear transmission system according to claim 1, wherein said planetary gear support blocking means comprises: lugs projecting radially outwardly of and in spaced relation along the periphery of said planetary gear support; a pawl having an engagement tooth at one end; means pivotally mounting said pawl at the other end to said vehicle body for movement of said pawl relative to said planetary gear support, and means fixing said pawl to said cable so that, in accordance with said second step, said tooth engages one of said lugs to stop rotation of said planetary gear support.

3. A gear transmission system as claimed in claim 1, wherein said resilient means is a spring having one end secured to said vehicle body and the other end to the free end of said second arm, said other end of said cable being secured to said second arm so that pulling of said cable opposes the bias of said spring.

4. A gear transmission system as claimed in claim 1, wherein said shift mechanism further comprises: a pulley mounted for free rotation on said vehicle body, said cable winding around said pulley between said control member and said second arm, and wherein said resilient means is a spring having one end secured to said vehicle body and the other end to the free end of said second arm, said other end of said cable being secured to said second ring arm so that pulling of said cable opposes the bias of said spring.

5. A gear transmission system in accordance with claim 1, wherein said ring means includes a ring cooperating with said groove of said planetary gear support through a pair of diametrically opposite bearings having rollers rotatable about a common axis normal to that of said shaft and at least partially contained in said groove.

6. A gear transmission system as claimed in claim 1, wherein said control member is an elongated lever mounted on said vehicle body for pivotal movement about an axis parallel to the axis of said shaft; said flexible cable being fixed, at the other end, to said lever intermediate the ends thereof; a lever rest defining three successive lands and secured to said body so that said cable other end be located between said lever pivot axis and said lever rest; said first step of said lever corresponding to a shift thereof from a first to a second one of said lands and said second step of said lever corresponding to a shift of said lever from said second step to a successive third land.

7. A gear transmission system particularly for a motor vehicle having a frame, said system comprising:
a shaft assembly made up of a hollow cylindrical outer driving shaft and a cylindrical inner driven shaft mounted coaxially with an in said driving shaft to be driven thereby; said driven shaft extending out of said driving shaft at both ends thereof;
means integral with one end of said driven shaft defining an internal gear circumscribing said shafts;
a sun gear integral with said driving shaft and located within said internal gear;
a planetary gear support radially extending from said driving shaft and mounted thereof for free rotation and slidable axial displacement therealong;
planetary gears rotatably mounted on said support to be slidable therewith, said planetary gears meshing respectively with said sun gear and said internal gear;
a driving assembly on said driving shaft including a power transmission member integral with said driving shaft for rotation therewith, said transmission member being disposed in radial facing relation with said planetary gear support;
cooperating gear teeth on said gear support and transmission member suitable to mesh together for forward driving said vehicle through unison rotation of said sun gear, planetary gears and internal gear about the axis of said shafts;
a shift mechanism; and
a control member mounted on said vehicle frame to be movable in two steps, said control member being connected to said shift mechanism to, in a first step, disengage said transmission member and said planetary gear support causing said support idly to rotate through said sun gear and planetary gears with said driven shaft coming to a stop under the resisting torque thereof and, in a second step, to stop rotation of said planetary gear support relative to said driving shaft thereby causing reverse rotation of said internal gear and driven shaft through said sun gear and planetary gears
wherein said shift mechanism comprises:
pushing means applicable on the surface of said planetary gear support facing said power transmission member and having a first and a second radial arm respectively on opposite sides of said planetary gear support;
means mounting said first arm on said vehicle body for pivotal action of said pushing means about an axis normal to the axis of said driving and driven shafts and means to displace said second radial arm to pivot said first arm, causing shifting of said planetary gear support for engagement and disengagement of the said respective cooperating teeth;
resilient means acting on said gear support to bias said cooperating teeth into meshing engagement;
a flexible cable fixed at one end to said control member and secured at the other end to said second arm, so constructed that pulling of said cable in one direction is against the bias of said resilient means and disengages said cooperating teeth in accordance with said first step; and
blocking means connected to said cable and operable, by further pulling of said cable in the said one direction and in accordance with said second step, to stop rotation of said planetary gear support.

8. A gear transmission system as claimed in claim 7, wherein said resilient means is a coil spring mounted about said driving shaft between said sun gear and said planetary gear support.

* * * * *